United States Patent Office 2,768,082
Patented Oct. 23, 1956

2,768,082
METHOD FOR THE PREPARATION OF A CAKE BATTER

Lloyd B. Crossland, Norwalk, and Harry K. Beasley, Redding Ridge, Conn., assignors to R. T. Vanderbilt Company, Inc., New York, N. Y., a corporation of New York No Drawing. Application March 10, 1953,
Serial No. 341,597

6 Claims. (Cl. 99—92)

Our invention relates to cake, and more particularly to the preparation of cake batter.

In the art of baking, it is known that to make acceptable cakes the batter must be mixed until it is uniform and contains small air bubbles which form nuclei for the leavening gases (water vapor and carbon dioxide) when such gases expand and raise the cake during the baking of the batter. The volume of the finished cake is in some way related to the number and size of these small air bubbles.

Heretofore, the formation of these small air bubbles has been dependent upon the egg or shortening ingredient used in the preparation of the batter. The volume of the cake produced was determined to a marked degree by the quantity of egg or shortening employed. However, the use of these materials to facilitate the formation of the small air bubbles has imposed rather severe formula limitations if a cake which is both appetizing and commercially practical is to be prepared.

When eggs are used as an aerating agent, a critical procedure must be carefully followed in order to provide a commercially acceptable cake. Thus, the eggs are warmed to 100° F. with an equal weight of sugar and the mixture is whipped until a light foam results. A further quantity of sugar is then added together with the milk, and whipping is continued. Finally, the flour, salt and leavening agent are carefully folded in, after which the batter is baked.

Even a skillful operator has difficulty in achieving uniform cake quality using such a method, unavoidable variations in egg properties, temperature and specific procedure causing differences in the cake. Moreover, formulas relying solely upon the aerating properties of eggs require a relatively large proportion of egg to flour and are not capable of taking advantage of the tenderizing action of more than very small amounts of oil or fat. As a result, such cakes dry out and become objectionably hard quite rapidly.

In those types of cakes which utilize shortening for the purpose of introducing air bubbles into the batter, the volume of the cake baked becomes greater with increasing amounts of shortening. At the same time, however, since shortening also is a tenderizing ingredient in cake, the cake while becoming larger also becomes undesirably fragile unless a toughener such as eggs is added usually in the same proportion as the shortening. This in a sense fixes the proportions of shortening and egg in this type of cake.

Furthermore, although shortening is the volume-producing element in this type of cake, control over the quantity of shortening used does not necessarily make possible control over cake volume. The air incorporating properties of shortening depend upon its physical properties and such properties are very susceptible to damage by temperature. For best results, shortening should be stored and used at about 70–75° F., and if this temperature range is not adhered to cake volume will be low. Modern emulsifying shortenings are particularly susceptible to temperature damage.

In accordance with our invention, we have developed a method for the preparation of cake batter which does not suffer from the shortcomings of the methods just discussed. Essentially, the method which we have devised is a simple whipping procedure involving the use of an edible, foaming emulsifier and an edible oil. When our process is carried out the flour and at least a portion of the sugar are first whipped with the emulsifier. Aeration takes place rapidly under these conditions, the whipping being terminated when specific gravity measurements indicate that the aeration has reached the desired point. The liquid edible oil and remaining sugar are added to the foam in order to impart shortness to the cake. The manner in which the eggs are incorporated is not critical, it being possible to add them to the original mixture aerated to make the foam or to the foam itself.

The entire time required for our process is as short as about 5 minutes, whereas conventional methods for the preparation of cake batters require at least about 10 minutes. However, while our process shares somewhat the high temperature limitation of shortening batters, our process becomes more efficient at temperatures below which shortening cakes cannot be made.

An additional advantage characterizing our process arises from the fact that it uses oil instead of semi-solid shortening. Thus, oil can readily be poured, pumped, metered and stored in bulk. This is of importance in the baking industry, since the success of bulk handling of liquid sugar and wheat flours in bakeries has placed emphasis on the development of the continuous processing of bakery products. Our invention permits true continuous mixing and eliminates pre-mixing operations. All the cake ingredients used in our process are either liquids or powders and thus can be continuously metered to the mixing device. Oil is not harmed by temperatures of the range from about 40° F. to 90° F. Furthermore, oils are generally conceded to have more "shortening power" than semi-solid shortening, so that less oil than shortening is frequently found adequate for proper eating qualities. Finally, it is generally possible to purchase edible oils at a price considerably lower than that of conventional shortening.

A wide formula latitude is possible in practicing our invention. In general, however, per 100 parts of flour, from 90 to 140 parts of sugar, from 10 to 50 parts of oil and from 10 to 50 parts of eggs should be used, the parts being by weight. For best eating properties, the weight of the eggs should exceed the weight of the oil.

The following examples illustrate in detail the practice of our invention, the parts being by weight, unless otherwise specified.

*Example I*

In order to prepare a yellow layer cake, a mixture composed of the following ingredients was mixed for 2 minutes at high speed with a wire whip: flour, 100 parts; sugar, 100 parts; salt, 2 parts; baking powder, 5 parts; milk solids (non-fat), 10 parts; water, 95 parts; whole eggs, 25 parts; and emulsifier, 3 parts. Thereafter, 20 parts of salad oil was added gradually and the mixture was blended for one minute at low speed, thus resulting in the preparation of the cake batter. Ten ounce portions of this batter were baked in 8-inch round layer cake tins for 20 minutes at 375° F.

The method of preparing the emulsifier used in this example is as follows:

4 parts by weight of sorbitan monostearate, free of sodium stearate, and one part by weight of the condensation product of sorbitan monostearate and ethylene oxide containing 20 moles of ethylene oxide for each mole of sorbitan monostearate are separately charged to two jacketed kettles and heated to a temperature of about 160° F. Sodium propionate is dissolved in water in a third jacketed kettle in a proportion sufficient to provide the desired concentration of preservative in the final product, usually 0.35%. The sorbitan monostearate and the ethylene oxide-sorbitan monostearate condensate together with the aqueous sodium propionate solution, the latter being heated to about 145° F., are pumped from the three kettles through a suitable mixer at rates regulated to produce a mixed product containing 28% by weight of sorbitan monostearate, 7% of the condensation product and 65% of aqueous sodium propionate solution. The mixture is cooled to about 105° F. as it passes through the mixer. 5 to 10% by volume of air may be incorporated in the mixture during the mixing operation. The cooled mixture has much the appearance of hydrogenated vegetable oil shortening.

*Example II*

In order to prepare a yellow pound cake, the following ingredients were mixed for 2 minutes at high speed with a wire whip: flour, 100 parts; sucrose, 105 parts; salt, 2.5 parts; milk solids (non-fat), 11 parts; water, 79 parts; invert sugar, 5 parts; whole eggs, 50 parts; and emulsifier of Example I, 3 parts. To the batter 30 parts of salad oil was added gradually and the mixture was blended for one minute at low speed, thus resulting in the preparation of the cake batter. The cake batter thus produced can be baked in accordance with customary baking procedures.

*Example III*

In order to prepare a white layer cake, the following ingredients were mixed for 2 minutes at high speed with a wire whip: flour, 100 parts; sucrose, 115 parts; salt, 2.5 parts; baking powder, 5 parts; milk solids (non fat), 10 parts; water, 85 parts; egg white, 30 parts; cream of tartar, 0.5 parts and emulsifier of Example I, 6 parts. Thereafter 20 parts of salad oil was added gradually and the mixture was blended for one minute at low speed, thus resulting in the preparation of the cake batter.

*Example IV*

When devil's food or chocolate cakes are made by our process, we prefer to add the cocoa or chocolate last because these ingredients retard the aeration of the foam. A convenient mode of addition is to mix the cocoa or melted chocolate with the oil and add this mixture as a slurry to the batter.

Thus, in order to prepare a devil's food cake, the following ingredients were mixed for 2 minutes at high speed with a wire whip: flour, 100 parts; sucrose, 120 parts; salt, 3 parts; baking powder, 5 parts; baking soda, 2 parts; milk solids (non-fat), 15 parts; water, 150 parts; whole eggs, 40 parts; and emulsifier of Example I, 3 parts. Thereafter, a mixture of 20 parts of salad oil and 20 parts of cocoa was blended for one minute at low speed, thus resulting in the preparation of the cake batter.

Various modifications can be made in the specific procedures just described to provide other embodiments which fall within the scope of our invention. For example, in place of the salad oil used there can be substituted any of the conventional edible oils, such as corn oil, cottonseed oil, soya oil or peanut oil. Furthermore, any of the conventional edible, foaming emulsifiers can be employed in place of the particular one utilized in the specific examples. Among such emulsifiers are self-emulsifying stearin monoglycerides. Particularly valuable emulsifiers are those disclosed in Johnston Patent No. 2,569,527, issued October 2, 1951. Such emulsifiers are a paste-like composition which consists essentially of sorbitan monostearate, a relatively smaller amount of an activator for the sorbitan monostearate and water. The activator can be a condensate of ethylene oxide and a fatty acid having from 12 to 18 carbon atoms, including hydroxy acids, the molar ratio of ethylene oxide to acid being within the range 70:1 to 130:1. The activator can also be a condensate of ethylene oxide and a monosorbitan of the aforementioned class of fatty acids, the ethylene oxide-monosorbitan ratio being within the range 10:1 to 30:1. Finally, the activator can be a condensate of ethylene oxide and castor oil in which the ethylene oxide-castor oil molar ratio is within the range 70:1 to 150:1.

The emulsifier used in accordance with our invention can also be one falling within the scope of those claimed in Johnston Patent No. 2,422,486, issued June 17, 1947. Such emulsifiers consist essentially of about 27–15 parts by weight of a condensation product of sorbitan monostearate, mannitan monostearate and/or dulcitan monostearate and ethylene oxide in a molar ratio between about 1:2 and 1:6 and about 3–15 parts by weight of a condensation product of sorbitan monostearate, mannitan monostearate and/or dulcitan monostearate and ethylene oxide in a molar ratio between about 1:15 and 1:50 for a total of 30 parts of the combined condensation products emulsified in water. Based on active ingredients present in the emulsifier, we generally use from about 0.5 to about 3.0 percent by weight of emulsifier per 100 parts by weight of flour.

Moreover, in practicing our invention it is not necessary that either whole or egg whites be used. For example, in their place there can be substituted reconstituted eggs. Also, it is not essential that all of the sugar ultimately present in the finished cake batter be present in the mixture which is whipped in order to prepare the foam to which the liquid edible oil is later added. For example, the foam into which the edible oil is incorporated can be prepared using at least 75 parts by weight of sugar per 100 parts by weight of flour, the remaining sugar being added to the batter in the form of a mixture with the edible oil. In general, per 100 parts by weight of flour there will be from about 80 to about 200 parts by weight of liquid present in the batter preparation.

We claim:

1. A method for the preparation of a cake batter which comprises mixing 100 parts by weight of flour, from 90 to 140 parts by weight of sugar, from 10 to 50 parts by weight of an edible oil and from 10 to 50 parts by weight of eggs, with the proviso that in said method a liquid mixture containing the flour, at least 75 parts by weight of sugar and an edible foaming emulsifier is first mixed thereby incorporating air into the mixture, and said mixture is thereafter mixed with from 10 to 50 parts by weight of an edible oil and such sugar as is required for the batter to contain from 90 to 140 parts by weight of sugar.

2. A method according to claim 1 in which said edible oil is salad oil.

3. A method according to claim 1 in which said emulsifier is a paste-like composition which consists essentially of sorbitan monostearate, a relatively smaller amount of an activator for the sorbitan monostearate and water, the activator being a condensate from the group consisting of condensates of ethylene oxide and fatty acids, including hydroxy acids, containing from 12 to 18 carbon atoms in which the molar ratio of ethylene oxide to acid is within the range 70:1 to 130:1, condensates of ethylene oxide and the monosorbitans of such acids in which the ethylene oxide-monosorbitan molar ratio is within the range 10:1 to 30:1 and condensates of ethylene oxide and castor oil in which the ethylene oxide-castor oil molar ratio is within the range 70:1 to 150:1.

4. A method according to claim 3 in which said fatty acid is stearic acid.

5. In the preparation of a cake batter, the steps of mixing a liquid mixture containing 100 parts by weight of flour, from 90 to 140 parts by weight of sugar, from 10 to 50 parts by weight of eggs and an edible foaming emulsifier thereby incorporating air into the mixture, and thereafter admixing said mixture with from 10 to 50 parts by weight of an edible oil.

6. In the preparation of a cake batter, the steps of mixing a liquid mixture containing 100 parts by weight of flour, from 90 to 140 parts by weight of sugar and an edible foaming emulsifier thereby incorporating air into the mixture, and thereafter admixing said mixture with from 10 to 50 parts by weight of eggs and from 10 to 50 parts by weight of an edible oil.

References Cited in the file of this patent

UNITED STATES PATENTS

| | | |
|---|---|---|
| 2,422,486 | Johnson | June 17, 1917 |
| 2,532,523 | Trempel | Dec. 5, 1950 |